(12) United States Patent
Navarini et al.

(10) Patent No.: US 8,053,012 B2
(45) Date of Patent: Nov. 8, 2011

(54) METHODS AND APPARATUSES FOR OBTAINING BEVERAGES

(75) Inventors: Luciano Navarini, Trieste (IT); Luca Mastropasqua, Trieste (IT); Bruno Dellapietra, Duino Aurisina (IT); Furio Suggi Liverani, Trieste (IT)

(73) Assignee: Illycaffe' S.p.A., Trieste (IT)

( * ) Notice: Subject to any disclaimer, the term of this patent is extended or adjusted under 35 U.S.C. 154(b) by 1116 days.

(21) Appl. No.: 11/632,954

(22) PCT Filed: Jun. 6, 2005

(86) PCT No.: PCT/EP2005/006045
§ 371 (c)(1),
(2), (4) Date: Feb. 7, 2007

(87) PCT Pub. No.: WO2006/010404
PCT Pub. Date: Feb. 2, 2006

(65) Prior Publication Data
US 2007/0248728 A1     Oct. 25, 2007

(30) Foreign Application Priority Data
Jul. 30, 2004   (IT) ............................. M02004A0202

(51) Int. Cl.
*A47J 31/30*     (2006.01)
*A23F 5/26*      (2006.01)
(52) U.S. Cl. ............. 426/433; 426/434; 99/281; 99/294
(58) Field of Classification Search ................... 426/433, 426/434; 99/281, 294
See application file for complete search history.

(56) References Cited

U.S. PATENT DOCUMENTS

| 2,543,528 A | * | 2/1951 | Kaufmann | 99/292 |
| 2,756,667 A | * | 7/1956 | Burns | 99/285 |
| 3,781,521 A | * | 12/1973 | Kircher | 219/442 |

(Continued)

FOREIGN PATENT DOCUMENTS

DE    2 347 014    4/1976

(Continued)

OTHER PUBLICATIONS

International Search Report of PCT/EP2005/006045, mailed Jan. 3, 2006.

*Primary Examiner* — Anthony Weier
(74) *Attorney, Agent, or Firm* — Nixon & Vanderhye P.C.

(57) ABSTRACT

An apparatus for preparing a coffee beverage inducing the passage of an extraction fluid through a dose of coffee by heating said fluid, contains a separating device arranged to separate a fraction of said beverage obtained with a prevalently liquid phase of said fluid from a further fraction of said beverage obtained with a prevalently steam phase of said fluid; an apparatus for preparing a coffee beverage by imbibing a dose of coffee with an extraction fluid driven by heating through said dose, comprises an inhibition device arranged to inhibit said imbibing when said fluid contains a substantial steam phase; a method for obtaining a coffee beverage involves heating an extraction fluid so as to induce the passage of said extraction fluid through a dose of coffee to obtain said beverage and separating a fraction of said beverage obtained with a prevalently liquid phase of said extraction fluid from a further fraction of said beverage obtained with a prevalently steam phase of said extraction fluid is provided for.

34 Claims, 8 Drawing Sheets

U.S. PATENT DOCUMENTS

| | | | |
|---|---|---|---|
| 4,083,295 A * | 4/1978 | Hollingsworth | 99/283 |
| 4,791,859 A | 12/1988 | King | |
| 6,161,469 A | 12/2000 | Rolla et al. | |
| 2006/0011069 A1* | 1/2006 | Spencer | 99/307 |
| 2009/0223376 A1* | 9/2009 | Navarini et al. | 99/293 |

FOREIGN PATENT DOCUMENTS

| | | |
|---|---|---|
| EP | 0 148 982 A2 | 7/1985 |
| EP | 0 607 765 A1 | 12/1993 |
| RU | 2086169 C1 | 8/1988 |
| WO | 94/07400 | 4/1994 |

* cited by examiner

METHODS AND APPARATUSES FOR OBTAINING BEVERAGES

This application is the US national phase of international application PCT/EP2005/006045, filed 6 Jun. 2005, which designated the U.S. and claims priority of IT MO2004A000202, filed 30 Jul. 2004, the entire contents of each of which are hereby incorporated by reference.

The invention relates to improved methods and apparatuses for obtaining coffee-based beverages, in particular to be prepared with steam-pressure coffee machines.

Different types of steam-pressure coffee machines are known that are used above all for domestic use, in which the steam generated inside a boiler exerts a pressure that thrusts the water contained in the boiler to pass through a panel of coffee powder, producing to the coffee beverage.

Such steam-pressure coffee machines shall hereinafter be referred to as "Mocha".

The "Mocha" coffee machines in the embodiment shown in FIG. 10a comprise two receptacles that can be hermetically tightened together: a first receptacle acts as a boiler formed in such a way as to contain water to be heated and to be itself heated by a suitable source of energy, and is provided with a relief valve that is suitably calibrated and arranged to prevent the pressure inside the boiler from exceeding a set limit value, a second receptacle that acts as a tank in which the produced beverage is collected.

"Mocha" coffee machines furthermore comprise a filtering funnel interposed between the boiler and the tank and formed in such a way as to receive a set quantity of coffee powder, and a duct for conveying the produced coffee beverage to the tank.

When it is desired to prepare the coffee, a desired quantity of water is poured into the boiler and a desired quantity of coffee is poured into the filtering funnel container and the water of the boiler is heated to take it to boiling point.

As known to those skilled in the art, heating produces increased pressure inside the boiler that thrusts the water therein to pass through the filtering funnel, to go through the coffee powder, thereby imbibing it is and giving rise to the coffee beverage, which passes through a second filter provided at the base of the collection tank, rises up the duct provided inside the tank and emerges at the top part of the duct so collecting in the collection tank.

To generate heating of the water of the boiler, different heat sources can be used, for example the flame of a common gas stove, or an electric plate.

In another type of steam-pressure coffee machines, such as the one shown in Figure F, the collection tank of the coffee beverage is missing and the duct is so shaped as to convey the produced beverage directly to suitable containers, for example one or more cups of a user that can be placed at an outlet portion of the duct.

The duct can be provided with an upper cover shaped in such a way as to identify on a side surface of the duct suitable outlet orifices for the exit of the beverage and be arranged to prevent the beverage, thrust by high pressure, from spurting outside the tank.

In a further type of steam-pressure coffee machines shown in Figure G, there is provided a boiler of the autoclave type inside which the water to be heated is poured, the boiler is electrically heated and following heating into the boiler there is generated steam that pushes the water through a panel of coffee placed on a filter holder from which the produced beverage exits that is collected in suitable containers, for example one or more cups of users, which are located at the filter holder.

The filter holder is shaped in such a way as to be similar to those used in espresso coffee machines in order to simulate the preparation of espresso coffee.

In order for coffee machines to correctly simulate espresso preparation, they have to deliver the coffee beverage in a reasonably short time, so that the temperature in the boiler has values that are significantly greater than 100° C., and these values are reached in a particularly short time.

A drawback of steam-pressure "Mocha" coffee machines like those disclosed above, is that the beverage produced has organoleptic features that are inferior to those of beverages obtained by infusion, or with "espresso" coffee machines, in which extraction is not achieved by steam pressure but by a pump that drives the hot water into contact with the coffee powder.

This is due to the particular temperature and pressure conditions that are generated within such coffee machines during the extraction process.

A further difference between extraction by infusion or pressure percolation achieved with "espresso" coffee machines and the extraction in the steam pressure coffee machines is that in the latest part of the coffee drink is obtained by making water in the form of steam pass through the coffee powder.

In order to overcome this problem, EP0607765 provides for making a coffee machine comprising two distinct boilers into which to pour the water: a first boiler to be placed in contact with a heat source and a second boiler interposed between the first boiler and a filter containing the coffee powder.

When the water of the first boiler is brought to boiling point, it exerts thrust pressure against a piston interposed between the first and the second boiler that forces the water of the second boiler, which is hot but at temperature below boiling point, towards the coffee powder. In this way, the coffee beverage is obtained by imbibing the coffee powder at a temperature between 75° and 95° C.

Providing two different boilers for water, one with water to bring to boiling point and one with water to imbibe the coffee powder, is also known from EP0148982.

The presence of the second boiler for water makes the coffee machines seen above constructionally more complex and above all considerably more bulky than common coffee machines.

Furthermore, such coffee machines consume more energy than common coffee machines because a greater quantity of water has to be heated and they need more time to make the coffee beverage.

Cooling the water and/or the steam that is thrust up from the boiler by the thrust of the pressure generated inside the boiler by the heating of the water is furthermore known, for example from WO94/07400 or IT1245706.

The journey of the water and/or the steam towards the coffee powder is varied in such a way as to provide, before the passage through the coffee powder, the passage through exchanger elements in which the water cools and any steam that may be present condenses.

These solutions nevertheless have numerous drawbacks, in fact the presence of the exchanger element makes these coffee machines more complex and bulkier than common coffee machines. Furthermore, maintenance and cleaning operations are more delicate and require greater time and care than are necessary with common coffee machines.

Such coffee machines furthermore consume more energy than common coffee machines as all the water in the boiler is first heated and is then cooled before coming into contact with the coffee powder.

An object of the invention is to provide improved methods and apparatuses for producing coffee beverages.

Still another object is to provide simple and cheap apparatuses that enable a coffee beverage to be obtained with great organoleptic features.

A further object is to supply simplified methods and apparatuses that enable a coffee beverage to be obtained using water that is not in a steam state.

In a first aspect of the invention a method is provided for obtaining a coffee beverage comprising heating an extraction fluid such as to induce the passage of the extraction fluid through a dose of coffee to obtain said beverage, wherein separating a fraction of said beverage obtained with a prevalently liquid phase of said fluid from a further fraction of said beverage obtained with a prevalently steam phase of said fluid is provided for.

In a second aspect of the invention, an apparatus is provided for preparing a coffee beverage by inducing the passage of an extraction fluid through a dose of coffee by heating said fluid, wherein the apparatus further comprises a separating device arranged to separate a fraction of said beverage obtained with a prevalently liquid phase of said fluid from a further fraction of said beverage obtained with a prevalently steam phase of said fluid.

In a third aspect of the invention a method is provided for obtaining a coffee beverage comprising heating an extraction fluid to induce said fluid to pass through a dose of coffee, wherein this passing through is prevented when said fluid contains a substantial steam phase.

In a fourth aspect of the invention, an apparatus is supplied to prepare a coffee beverage by imbibing a dose of coffee with an extraction fluid driven through said dose by heating, wherein the apparatus further comprises an inhibition device arranged to inhibit imbibing when said fluid contains a substantial steam phase.

In an embodiment, said inhibition device comprises stop elements arranged to block said heating.

In another embodiment, said inhibition device comprises a monitoring system arranged to monitor the heating in such a way as to inhibit the formation of said steam phase in said extraction fluid.

The inhibition device may comprise a pressure-adjusting device arranged to adjust the pressure inside a tank containing the fluid by keeping it within a desired range of values; in a particular embodiment, the pressure-adjusting device enables the pressure to be maintained within a range between approximately 0.01 and 5 bar, these values are relative pressure values, assuming that the atmospheric pressure value is 0 bar.

The above-said inhibition device may further comprise a temperature-adjusting element for adjusting the temperature inside a tank containing the fluid, keeping it within a desired range of values; in a particular embodiment, the temperature-adjusting element enables the temperature to be kept within a range comprised between approximately 60° C. and 120° C.

In some embodiments, the inhibition device cooperates with sensors such as for example level-sensors, or pressure, or temperature sensors.

Owing to these aspects of the invention, it is possible to obtain a beverage by imbibing a set quantity of coffee only with water, i.e. preventing the coffee from being imbibed by a fluid containing steam.

The coffee can be in powder or anyway minced form to promote the extraction, or can be in the form of capsules, portions or cartridges containing desired preset quantities of coffee powder.

In this way it is possible to obtain a beverage with high organoleptic features and which is comparable to that obtained with "espresso" coffee machines.

The inhibition device and/or the separating device can be connected, by means of suitable modifications, to a "Mocha" coffee machine of any known type that can thus be used to obtain a high-quality coffee beverage.

The invention will be better understood and implemented with reference to the attached drawings that show an embodiment thereof by way of non-limitative example in which.

The graphs set out in FIGS. 1-7 were obtained using a three-cup electric Mocha machine that has been suitably adapted to facilitate the experimental tests.

By varying the coffee machine used and/or the value of one or more experimental parameters, such as for example the coffee/water ratio, the geometry of the coffee machine, the granulometry and/or the type of coffee powder used, the blend of coffee used, graphs are obtained with point values that are different from those shown in FIGS. 1-7 but with the same qualitative trend.

The considerations that follow with reference to the attached Figures therefore have general validity and can be extended to experiments using values other than the experimental parameters.

Figure 1:
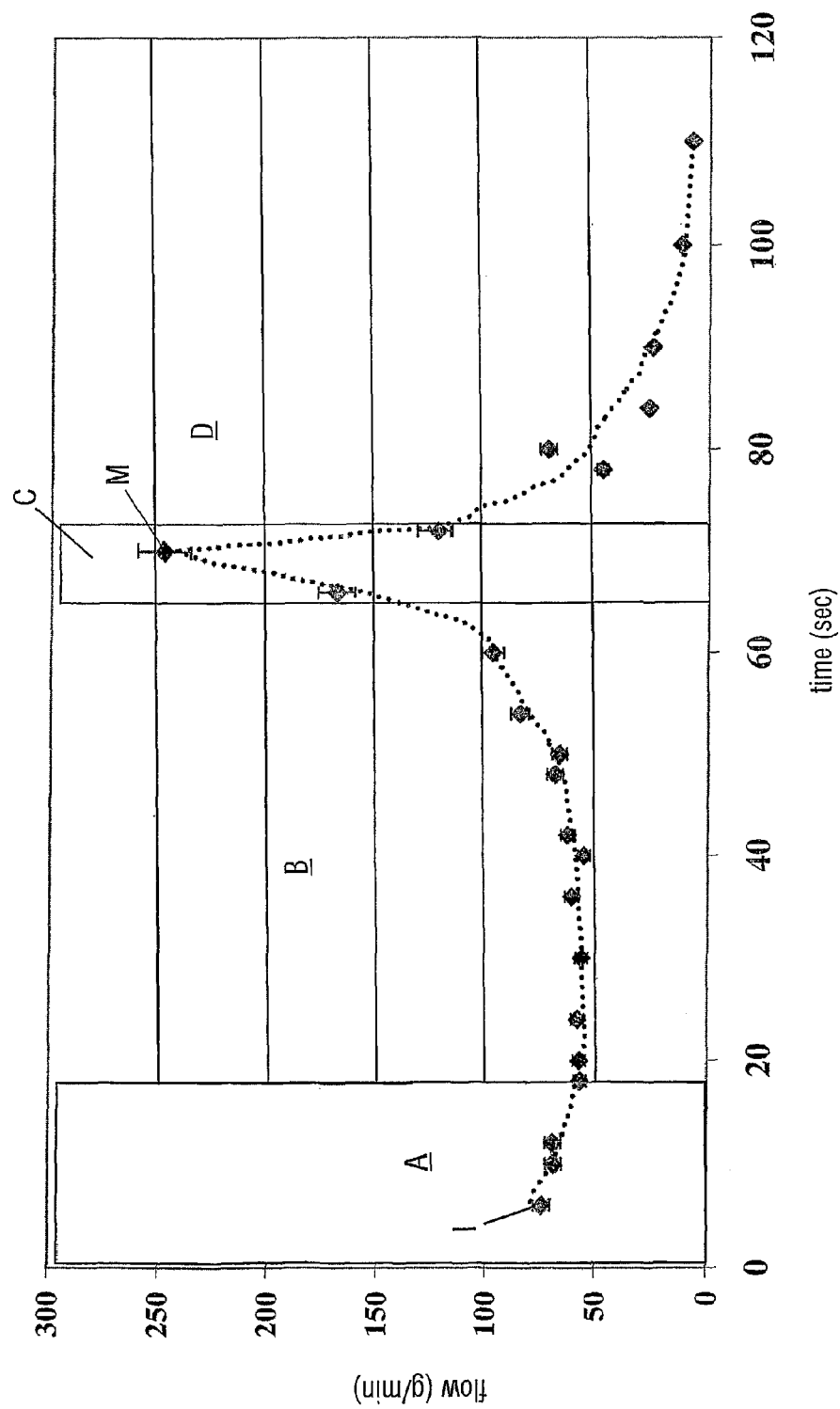
FIG. 1 is a graph that shows the flow rate [g/min] over time [sec] of a coffee beverage in an extraction procedure that provides for the use of an electric three-cup "Mocha" machine according to the state of the art.

The production dynamics of a coffee beverage with a traditional "Mocha" type coffee machine is explained with the help of the graph in FIG. 1 that shows on the Y axis the flow values [g/min] of a coffee beverage produced and on the X axis shows the time [sec], and in which I indicates the average flow calculated on the quantity of beverage collected in the first 6 seconds from the moment of the appearance of the first drop of beverage.

In the process of preparation of the coffee beverage 4 phases can be distinguished:

an imbibing phase, indicated by A in FIG. 1, in which the water that is driven towards the coffee powder by an increase in the pressure in the boiler imbibes the initially dry powder and starts extraction of the coffee beverage. This phase is characterised by progressively decreasing values over time of the flow of produced beverage because the water imbibing the coffee powder causes it to swell and compact. In this phase the beverage is extracted with water in liquid state;

an extraction phase, indicated as B in FIG. 1, in which the flow values of the produced beverage remain almost constant over time and in which the beverage is produced by extraction from the coffee powder with water in liquid state;

a transition phase, indicated by C in FIG. 1, in which the flow values of the produced beverage increase rapidly over time until they reach a maximum value indicated as M and then decrease just as rapidly. In this phase the water changes from liquid state to steam state;

a further extraction phase, indicated as D in FIG. 1, characterised by decreasing flow values of the produced beverage, in which extraction of the coffee beverage occurs through contact between the coffee powder and a mixture of water and steam.

In phase A and B, the coffee beverage is produced by extraction with water, a solid-liquid extraction, whereas, substantially at the maximum flow value M, extraction with a mixture of water and steam, a solid-liquid-steam extraction, starts. This phase is accompanied by gurgling noise that is typical of "Mocha" steam-pressure coffee machines.

The graph in FIG. 1 was obtained by pouring into the coffee machine 15 g coffee powder and 150 ml of water in a coffee/water ratio of 1/10 g/ml.

Figure 2:
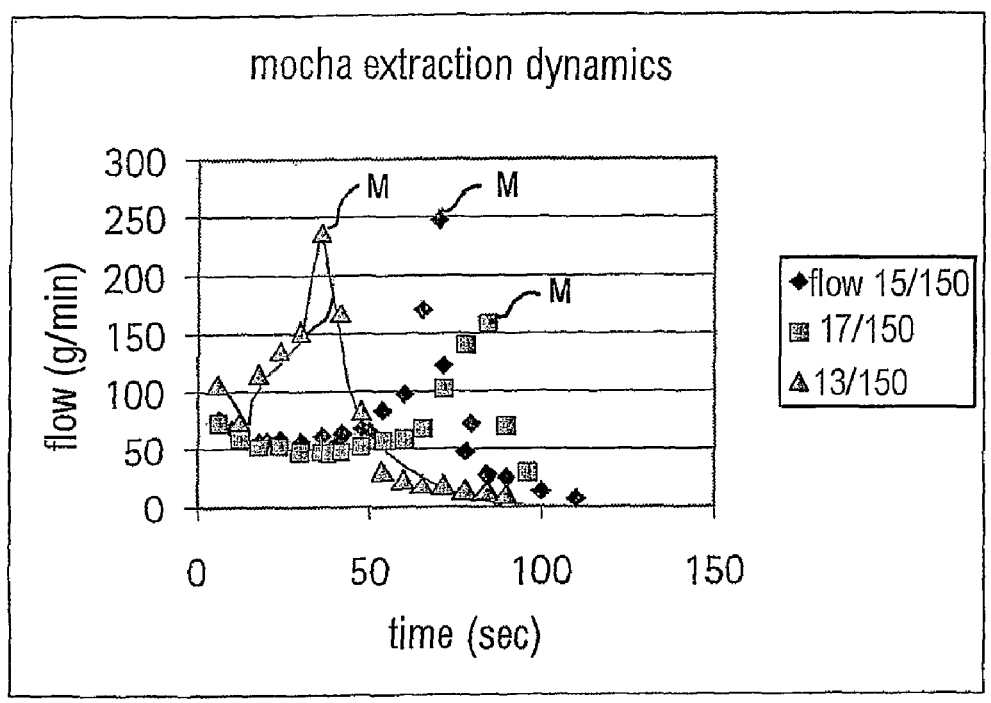
FIG. 2 is a graph that shows the flow rate [g/min] over time [sec] of a coffee beverage obtained with three distinct coffee/water ratios in a procedure according to the one in FIG. 1.

By varying the values of the coffee/water ratio, flow/time curves are obtained with different point values from the one shown in FIG. 1, but with unvaried quality, as can be seen from the analysis of the graph in FIG. 2 showing the flow of the beverage obtained over time with coffee/water values that are respectively 15/150, 13/150 and 17/150.

The three curves of FIG. 2 show an identical qualitative development, the four phases of the preparation process of the beverage can in fact be identified and, in each curve the point M, namely the moment of maximum flow of produced beverage, can be distinctly identified with different coordinates.

By repeating the process of production of the coffee beverage with a three-cup electric "Mocha", suitably modified to facilitate sampling, for each production cycle 10 fractions of coffee beverage of equal weight are taken weighing 11 g that are subjected to different chemical-physical and sensorial analyses in order to investigate their qualities and properties.

An analysis of the aspect of the obtained fractions has shown that the first four fractions are particularly transparent and have an intense reddish brown colour, the subsequent fractions become progressively cloudier and with a less intense colouring and the last two fractions are cloudy and with a very intense dark brown colour and have oily particles dispersed over the surface.

Figure 3:
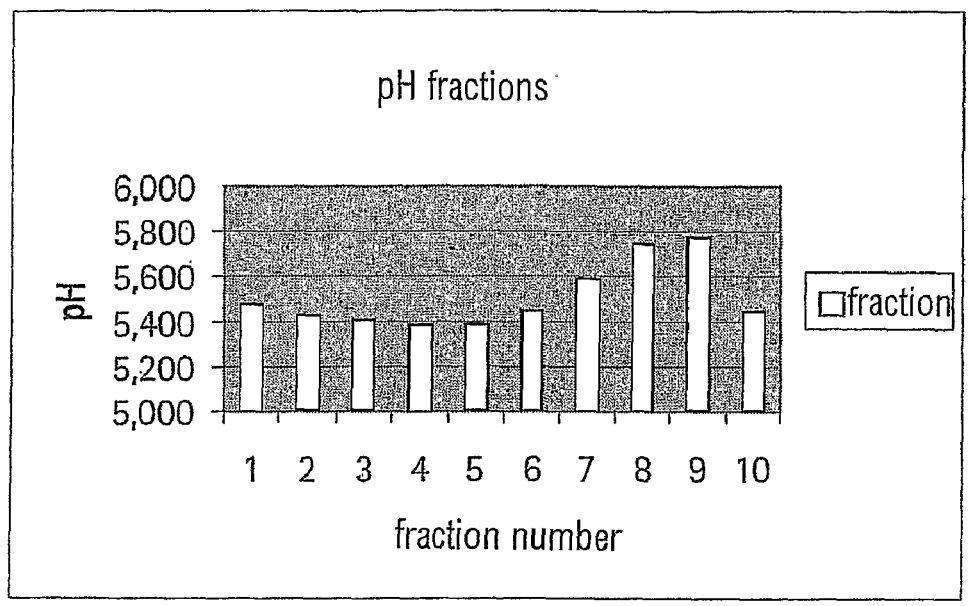
FIG. 3 is a graph that shows the pH values of subsequent fractions of coffee beverage obtained with the procedure according to FIG. 1.
Figure 4:
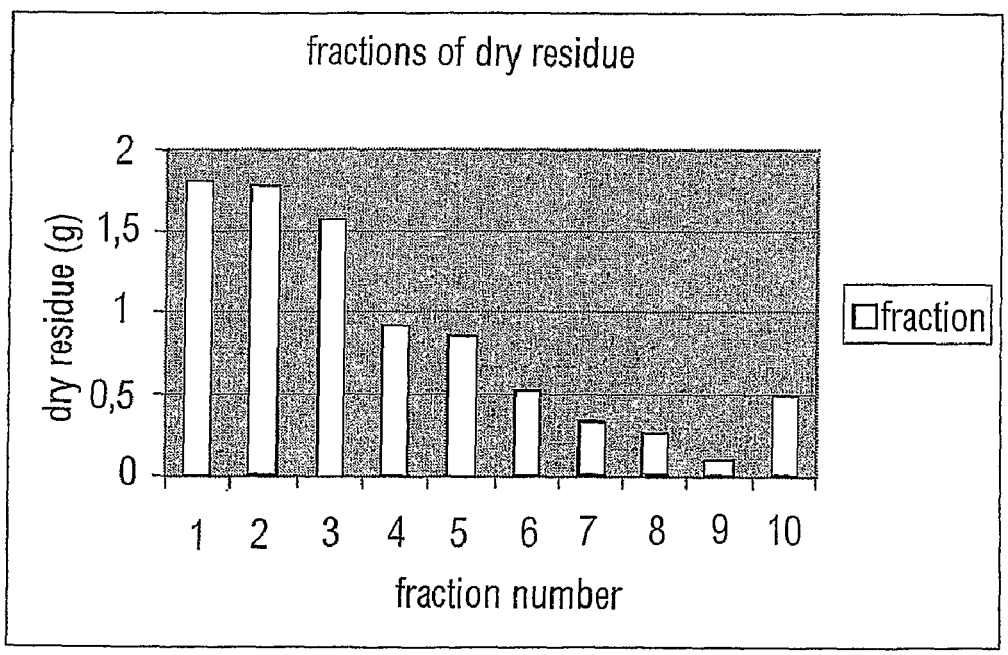
FIG. 4 is a graph that shows the dry residue values [g] of subsequent fractions of coffee beverage obtained with the procedure according to FIG. 1.
Figure 5:
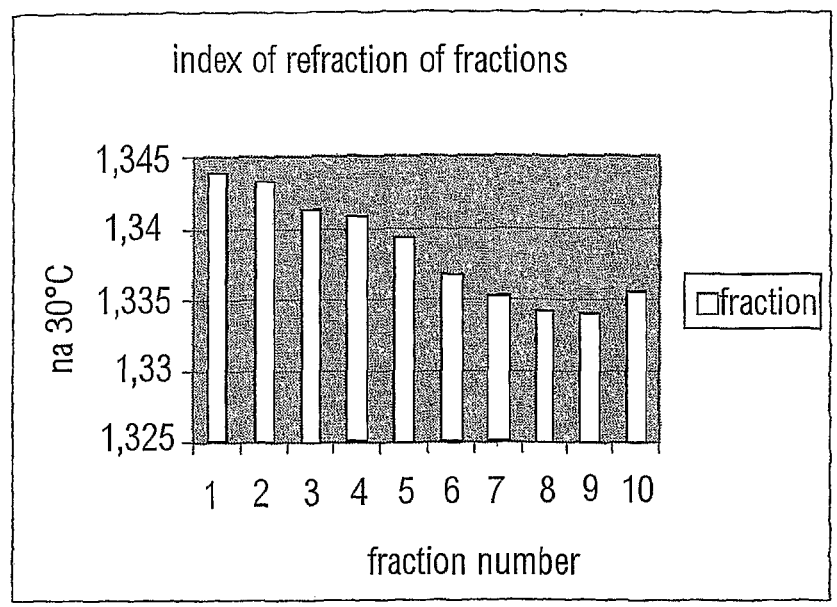
FIG. 5 is a graph that shows the variation of the refraction index in subsequent fractions of coffee beverage obtained with the proceeding according to FIG. 1.

FIGS. 3 to 5 show respectively the pH values, the dry residue and the refraction index of the different fractions of beverage.

An analysis of the graph in FIG. 3 shows that the pH value decreases slightly from the first to the fourth fraction and then increases more decisively from the fifth to the ninth fraction and then suddenly falls at the tenth fraction.

FIG. 4 shows the quantity of dry residue [g] in the different fractions of beverage obtained from 25 ml of each fraction. As can be seen from the graph, the quantity of dry residue of each fraction diminishes constantly in the subsequent fractions from the first to the ninth, reaches the minimum value in the ninth fraction and then grows from the ninth to the tenth fraction. FIG. 5 shows the trend of the refraction index in the beverage fractions obtained by Illycaffè protocol. The refraction index has values of approximately 1.34 in the first five fractions and reaches the minimum values of approximately 1.334 in the eighth and ninth fractions.

The 10 fractions of beverage obtained were further subjected, after SBSE extraction (Stir Bar Sorptive Extraction), to chromatographic analyses to determine the quantity of the volatile aromatic substances contained therein.

Figure 6:
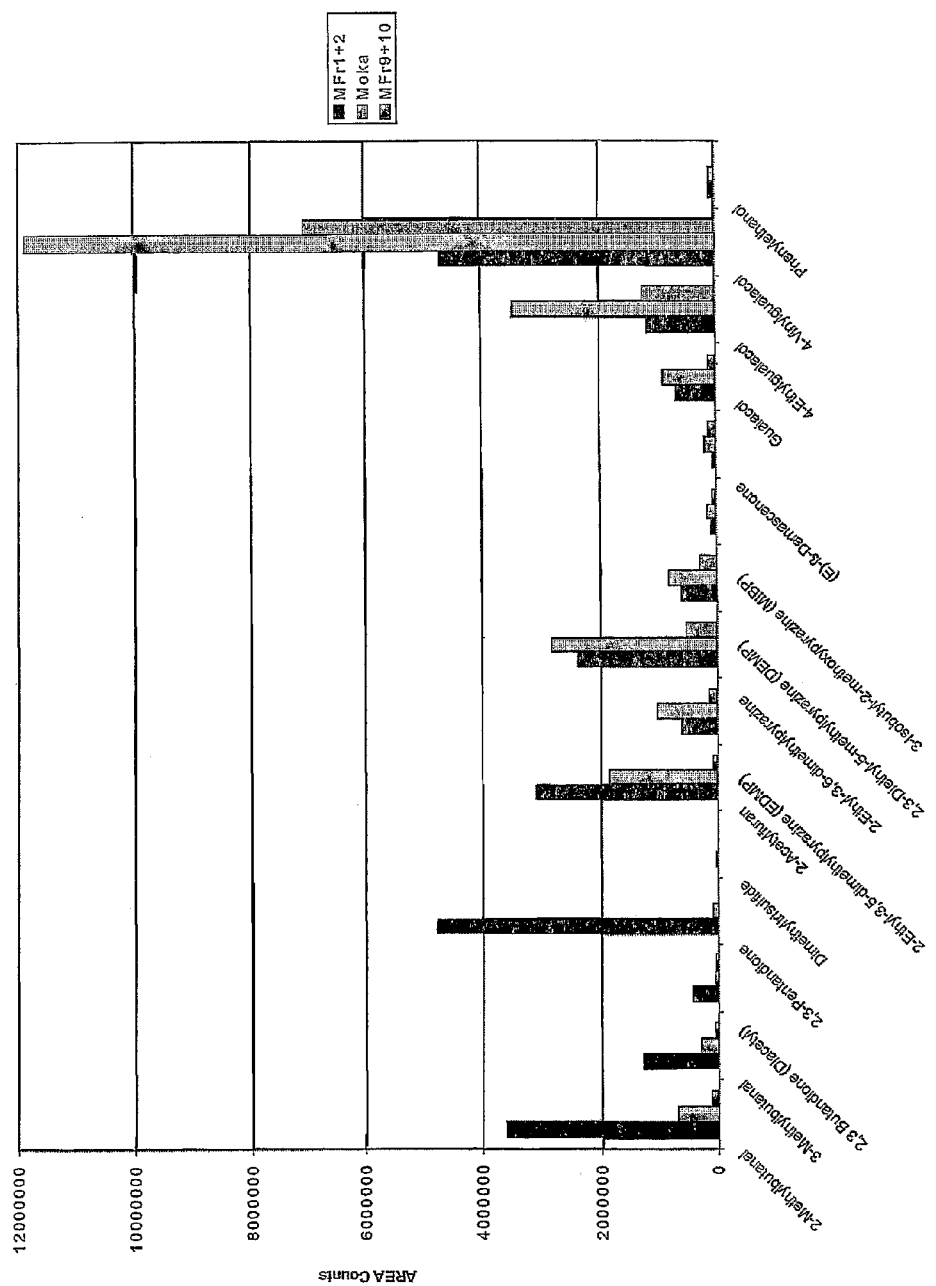
FIG. 6 is a graph that shows the concentrations of some aromatic substances in the coffee beverage obtained using the procedure according to FIG. 1.

FIG. 6 shows, in terms of area, the quantities of the aromatic substances found in the first and second combined fractions, and in the ninth and tenth combined fractions and the average quantities of these substances in the non-fractioned beverage.

These values are also set out, if available, in Table 1, respectively in columns 3, 4, 5; column 1 of this table shows the aromatic substances.

| COMPOUND | BEVERAGE AVERAGE | FRACTIONS 1 + 2 | FRACTIONS 9 + 10 |
|---|---|---|---|
| 2-methylbutanal | 684261 | 3617450 | 118003 |
| 3-methylbutanal | 283392 | 1294385 | 37559 |
| 2,3-butandione | 28469 | 435045 | 19346 |
| 2,3-pentandione | 74388 | 4774112 | n.a. |
| dimethyl sulphide | n.a. | 29132 | n.a. |
| 2-acetylfuran | 1854707 | 3099263 | 66507 |
| 2-ethyl-3,5-dimethylpyrazine | 1027553 | 621688 | 134626 |
| 2-ethyl-3,6-dimethylpyrazine | 2847963 | 2385983 | 517735 |
| 2,3-diethyl-5-metylpirazine | 806350 | 596872 | 272601 |
| 3-isobutyl-2-methoxypyrazine | 147320 | 85330 | 67340 |
| 4-hydroxy-2,5-dimethyl-3(2H)-furanone | n.a. | n.a. | n.a. |
| 2(5)-ethyl-4-hydroxy-5(2)-methyl-3(2H)-furanone | n.a. | n.a. | n.a. |
| 3-hydroxy-4,5-dimethyl-2(5H)-furanone | n.a. | n.a. | n.a. |
| (E)-β-damascenone | 193042 | 58413 | 135298 |
| Guaiacol | 898993 | 676585 | 109555 |
| 4-ethylguaiacol | 3475261 | 1192214 | 1222443 |
| 4-vinylguaiacol | 11843980 | 4685742 | 7058276 |
| Phenylethanol | 89277 | 101096 | n.a. |

An analysis of the graph of FIG. 6 and/or Table 1 shows that different volatile substances such as for example 2-methylbutanal, 3-methylbutanal, 2,3 butandione are more heavily present in the first two fractions than in the last two fractions of beverage; whereas other different aromatic substances such as for example vinyl-guaiacol and ethyl-guaiacol beta-damascenone are present in greater quantities in the last two fractions of beverage than in the first.

It should therefore be noted that the first two combined fractions of produced coffee beverage have different aromatic substances from those that are present in the last two combined fractions.

Figure 7:
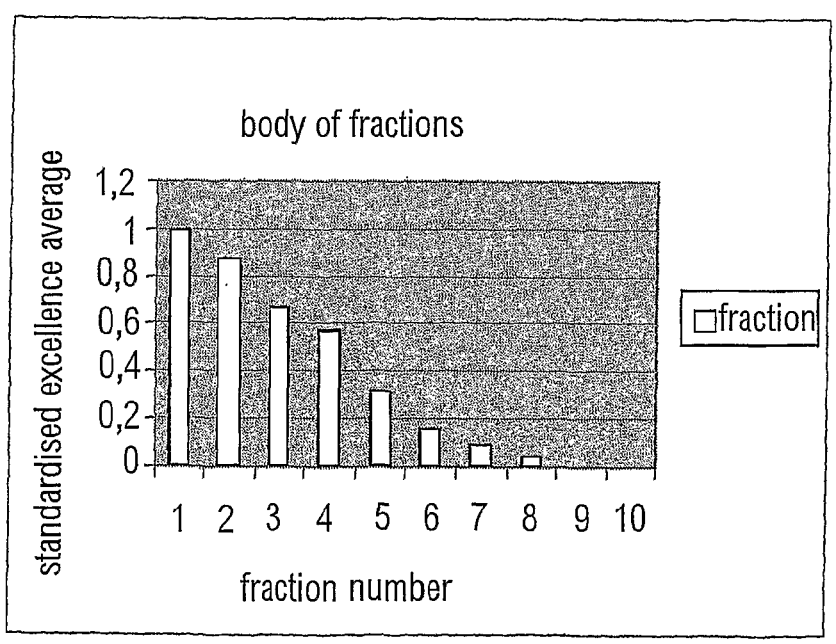
FIG. 7 is a graph that shows the average excellence indicator of the body of the coffee beverage obtained with the procedure according to FIG. 1.

The fractions of beverage were finally subjected to an organoleptic analysis with which the overall assessment, or excellence indicator, of the coffee and the appreciation of the beverage was investigated on the basis of different descriptors of the quality of the beverage itself, as for example the body, the excellence indicator of the beverage in the different fractions is shown by way of example in the graph in FIG. 7.

The first three fractions of beverage have been judged in a generally very favourable rating, this rating decreases from the fourth fraction onwards; from the sixth fraction onwards foreign aromas (off-flavour), or aromas that are not typical of coffee beverage are noted, in particular, for example, the sixth fraction is characterised by a taste of wet paper, the seventh and eighth by a metal taste, the ninth by an unpleasant heavily metallic taste, the tenth by an extremely unpleasant bleach taste.

In general, the appreciation of the fractions is very great when the fractions are obtained by solid-liquid extraction, progressively decreases until it disappears where the fractions are produced by solid-liquid-steam extraction.

For this reason, it is necessary to separate the last fractions of beverage from the others to prevent the organoleptic properties of the entire obtained beverage from being lowered, or it is necessary to maintain the process of preparation of the coffee beverage within conditions of solid-liquid extraction.

Figure 8:
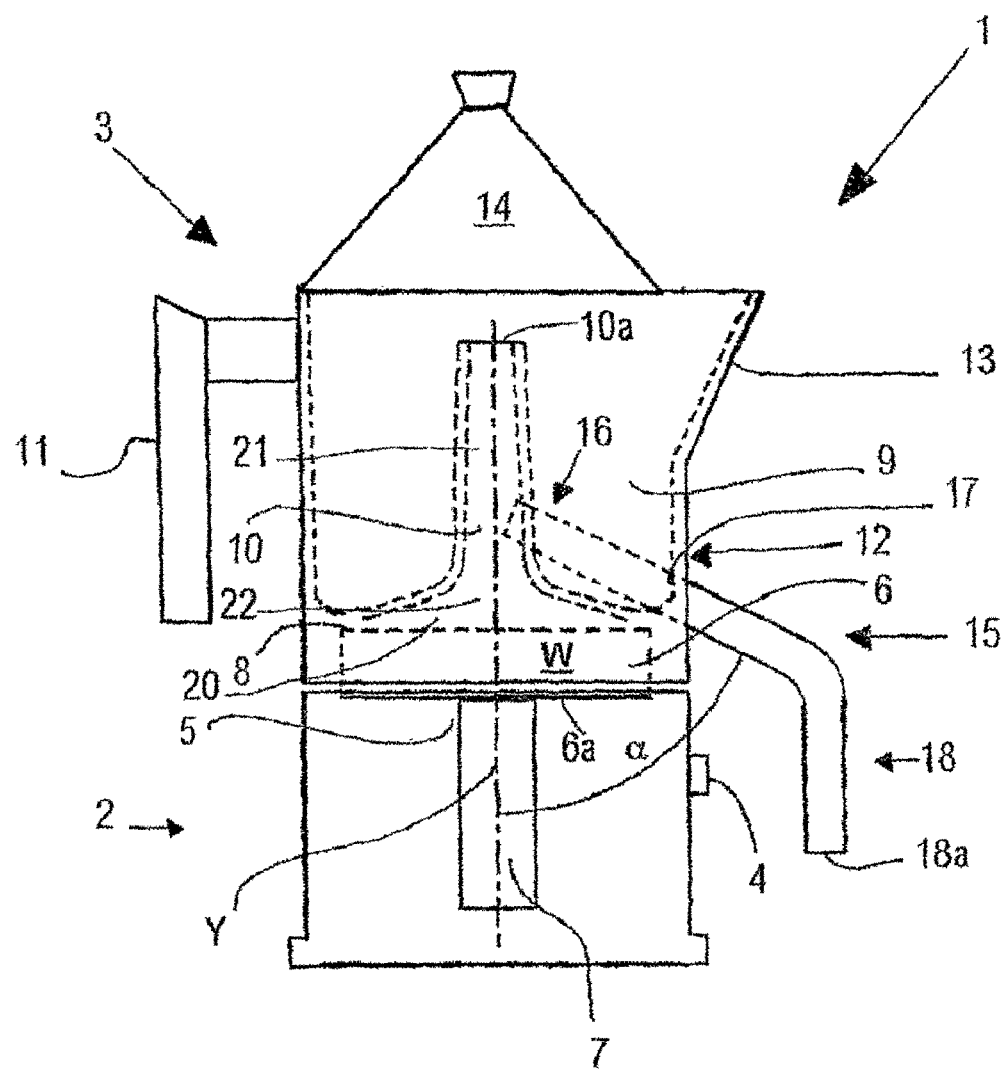
FIG. 8 is a lateral schematic section of a "Mocha" coffee machine according to the invention.
Figure 9:
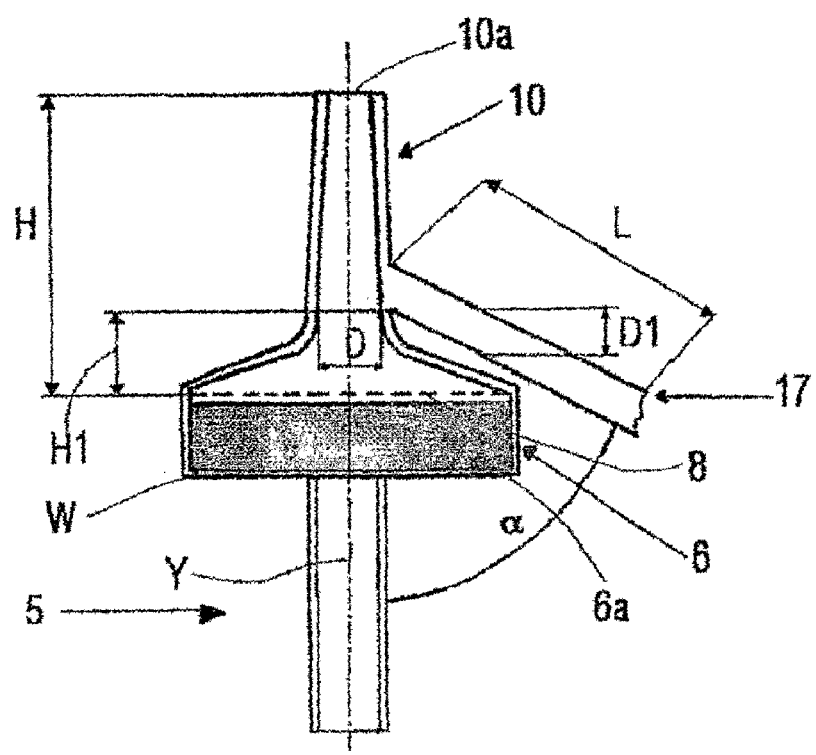
FIG. 9 is an enlarged detail of FIG. 8.

FIGS. 8 and 9 show a general model of coffee machine 1 of the "Mocha" steam-pressure type, but the subsequent considerations, when it is not explicitly declared, may apply to any other desired coffee machine of the "Mocha" pressure-steam type, and may furthermore extend, if necessary simple dimensional modifications can be made, to coffee machines suitable for obtaining different quantities of coffee beverage, or a different number of cups of coffee for each operating cycle.

In particular, the ranges specified below for the parameters of FIG. 9 were identified following laboratory tests as possible variation ranges of the above parameters relatively to coffee machines that produce 1 to 12 cups, but with simple scale changes further values of the parameters can be obtained to use with coffee machines with different productive capacity.

Furthermore, in order to apply the invention, coffee machines can be used to be connected to any source of energy, such as gas stoves, or electric plates, or microwave ovens, or also coffee machines with incorporated electrical resistances.

The coffee machine 1 comprises a boiler 2 into which the water to be heated is poured, which is placed in contact with a source of heat and which is provided with a safety valve 4 arranged to prevent pressure inside the boiler 2 exceeding a given maximum value, and an upper portion 3 that is tightened during use onto the boiler 2.

A funnel container 5, comprising a containing cavity 6 that is delimited at the bottom by a filtering surface 6a and inside which a desired quantity of coffee powder indicated by W is poured, and a duct 7 projecting from the containing cavity 6, is inserted inside the boiler 2 in such a way that the duct 7 is projected from the containing cavity 6 towards the bottom of the boiler 2.

The upper portion 3 comprises a lower filtering surface 8, a tank 9 in which the produced coffee beverage is collected and which is connected to the lower surface 8 by a hollow conduit 10, a grip 11 for facilitating a user's grasp of the coffee machine 1, a side surface 12 provided with a projecting portion 13 spout shaped through which the beverage is poured, and a removable lid.

The hollow conduit 10 comprises a substantially frustum conical portion 20 arranged on the lower surface 8 and a conveying portion 21 connected to the frustum conical portion 20 by a connecting zone 22 have a circular section with a diameter indicated as D in FIG. 9 that can be comprised between 3 and 15 mm.

The frustum conical portion 20 conveys the coffee beverage that exits from the lower surface 8 to the conveying portion 21, extending from the connecting zone 22 to an upper surface 10a of the hollow conduit 10, the coffee beverage runs into the hollow conduit 10 and is then discharged through its upper surface 10a. The conveying portion 21 may have a cylindrical shape or a shape that is slightly funnelled upwards.

The hollow conduit 10 has an overall longitudinal extent, defined as the distance between the lower filtering surface 8 and the upper surface 10a, indicated as H in FIG. 9, preferably comprised between 10 and 150 mm, and is shaped in such a way as to offer the least possible resistance to the exiting of the beverage obtained by extraction with steam in order to facilitate, as shall be seen below, the separation between the fraction of beverage obtained with a prevalent liquid phase from the fraction obtained with a prevalent steam phase.

In particular, the conduit 10 is provided with an upper surface 10 a from which the coffee beverage exits that is obtained with a completely free outlet section, i.e. the portions that partial cover the upper surface 10a are not provided that are on the other hand provided in the state of the art.

Inside the tank 9 a conveying conduit 15 is inserted comprising an end 16 that is inserted inside the conduit 10, a portion 17 that extends partially inside the tank 9 and partially outside it and that is arranged in such a way as to be tilted in relation to a vertical direction Y by an angle $\alpha$ comprised between 0° and 90°, and an outlet portion 18 having an almost vertical extent and terminating with an outlet end 18a.

The end 16 of the conveying conduit 15 can be inserted into the conduit 10 at a distance from the filtering surface 6a indicated by H1 in FIG. 9 comprised between 0 and 50 mm.

In particular, when the value of H1 is the same as 0 mm, the conveying conduit 15 is arranged at the same height as the lower surface 8, thereby terminating in the frustum conical portion 20 and receiving the coffee beverage produced directly by the lower surface 8.

The section of the conveying conduit 15 is almost circular with a diameter, indicated as D1 in FIG. 9, with a value that can be comprised between 1 and 10 mm; the tilted portion 17 of the conveying conduit 15 has an extent indicated by L in FIG. 9 the value of which can be comprised between 0 and 150 mm.

In order to prepare a coffee beverage, a suitable quantity of water is poured inside the boiler 2, a suitable quantity of coffee powder is poured into the funnel container 5 that is inserted inside the boiler 2, the upper portion 3 is tightened on the boiler 2 and the coffee machine 1 is then subjected to a heat source.

The water in the boiler 2 is heated, causing a pressure increase that thrusts part of the water of the boiler 2 to rise up through the duct 7 until it comes into contact with the coffee powder, imbibing it and extracting the coffee beverage therefrom, the coffee beverage passes through the lower filtering surface 8, rises up through part of the conduit 10 until it reaches the end 16 at which it leaves the conduit 10, flows through the conveying conduit 15 and is finally discharged through the outlet end 18a into a collection container for containing the fraction of beverage subsequently called "approved", which is located at the outlet end 18a.

Through the effect of the heat and the subsequent increase of pressure and temperature inside the boiler 2, after a certain lapse of time, extraction of the coffee beverage occurs through solid-liquid-steam extraction.

During this extraction phase the flow of produced beverage decreases over time but the thrust pressure increase, in other words the produced beverage is subjected to a thrust pressure in its ascent in the conduit 10 that is greater than that of the solid-liquid extraction phase, so the beverage produced runs through the entire conduit 10, emerges from the upper surface thereof 10a and is collected in the tank 9.

In this way, it is avoided that the fraction of beverage obtained by solid-liquid-steam extraction mixes with the fraction of beverage obtained by solid-liquid extraction and inside the tank 9 a beverage is obtained with inferior organoleptic features, said fraction of beverage being subsequently called as "rejected".

By varying the tilt of the portion 17 of the conveying conduit 15, it is possible to vary the ratio between the fraction of approved beverage and the fraction of rejected beverage collected inside the tank 9.

Laboratory tests have indicated an angle comprised between 0° and 90°, or comprised between 50° and 85°, in relation to the vertical, as an acceptable tilt value, this value being confirmed as acceptable also with different models of coffee machines on which the laboratory tests were conducted.

With the coffee machine 1 disclosed above, it is possible to obtain in a simple and economical manner a coffee beverage with pronounced organoleptic features by simply separating the fraction of beverage with an unpleasant taste from the fraction of beverage with a pleasant taste.

Alternatively, the solid-liquid-steam extraction of the coffee beverage for obtaining a coffee beverage with pronounced organoleptic features can be avoided.

In particular, coffee machines can be provided with temperature and/or pressure sensors, and/or water level sensors appropriately calibrated and connected to acoustic or visual elements in such a way that when certain values of said parameters are detected, acoustic or visual signals are emitted. In this way, a user is warned that solid-liquid-steam extraction is about to start and can decide whether to continue this extraction process or arrest it by acting on the heat source to have a beverage with pronounced organoleptic features.

Furthermore, in the electric coffee machines provided with an internal electric resistance, the sensor elements can be connected to on/off switches in such a way that when certain values of said parameters are detected that indicate the start of solid-liquid-steam extraction, the coffee machine is switched off, and production of a beverage with an unpleasant taste is thus automatically avoided.

Alternatively, in the electric coffee machines provided with an internal electric resistance the sensor elements may be connected to control elements for controlling the supplied power, in such a way that the electric power delivered is such as to prevent solid-liquid-steam extraction.

In another embodiment, it is further possible to suitably calibrate the safety valve with which the coffee machines are provided on a set pressure value, so as to prevent steam being generated inside the boiler, in such a way that when the set pressure value is reached in the boiler the safety valve opens to discharge the pressure inside the boiler, warning the user of the advisability of acting on the heat source.

In Table 2 attached below the results of experimental tests on different types of "Mocha" steam-pressure type coffee machines are set out, column 1, loaded with different quantities of coffee and water, column 2. Column 3 shows the quantity of approved beverage [g], columns 4 and 5 respectively show the average refraction index and the pH of the approved beverage, column 6 shows the quantity of rejected beverage [g], columns 7 and 8 respectively show the average refraction index and the pH of the rejected beverage, column 9 shows the residual quantity of water [g] in the boiler.

Figure 10A:
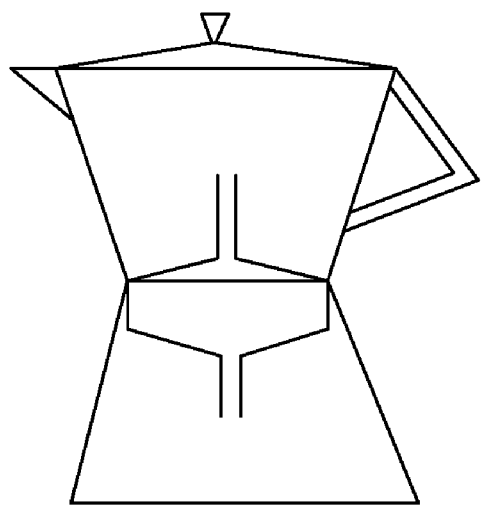
FIGS. 10a, 10b and 10c are schematic representations of different types of known steam-pressure coffee machines.
Figure 10B:
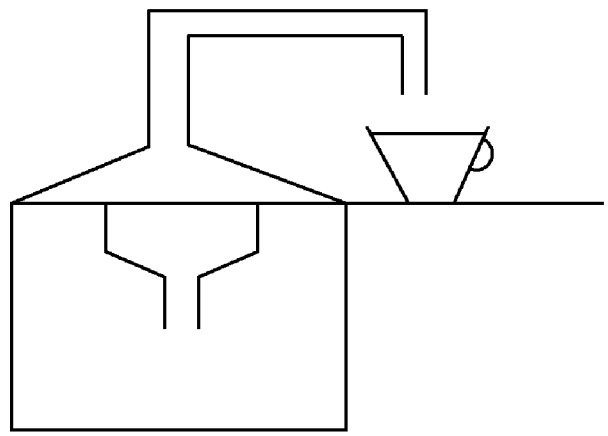
Figure 10C:
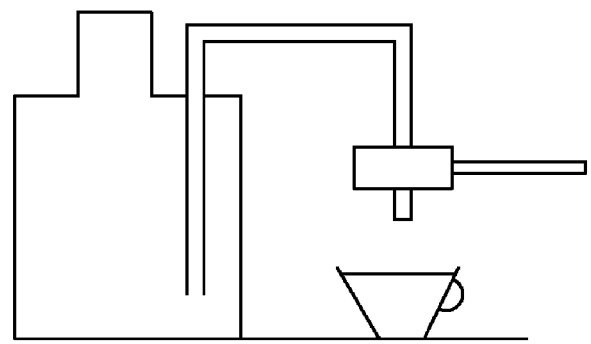

The results shown in lines 1-4 and 10-12 were obtained with coffee machines of the type schematically represented in FIGS. 10*a* and 10*b*, modified like the coffee machine in FIG. 8, i.e. with coffee machines provided with a beverage separator, the results given in lines 5-9 were obtained with coffee machines of the type schematically shown in FIGS. 10*a* and 10*c*, and G, in which it is provided to stop in different ways the extraction of the coffee beverage, in particular: the results given in lines 5, 6 were obtained with coffee machines provided with level sensors, the results given in line 7 with manual intervention at the start of the solid-liquid-steam extraction phase, the results given in lines 8, 9 by stopping heating upon respective reaching of relative pressure in the boiler 2 amounting to 0.7 and 0.5 bar.

The results shown in lines 1-9 were obtained with a coffee/water ratio value of 0.1, whereas the results of lines 10-12 with a coffee/water ratio value of approximately 0.113.

| Type of Mocha | Coffee/water | Approved beverage | | | Rejected beverage | | | Residual water |
|---|---|---|---|---|---|---|---|---|
| | | Weight [g] | RI (30° C.) | PH | Weight [g] | RI (30° C.) | pH | |
| TYPE 1 | 12/120 | 88.45 | 1.33981 | 5.423 | 3.22 | 1.33410 | na | 9.10 |
| TYPE 2 | 15/150 | 97.93 | 1.34000 | 5.483 | 28.25 | 1.33539 | 6.104 | 3.27 |
| TYPE 3 | 15/150 | 90.35 | 1.34096 | 5.426 | 32.48 | 1.33491 | 6.006 | 2.88 |
| TYPE 4 | 15/150 | 65.93 | 1.34384 | 5.436 | 55.07 | 1.33421 | 6.171 | 5.43 |
| TYPE 5 | 15/150 | 79.40 | 1.34257 | 5.314 | na | na | na | 46.70 |
| TYPE 6 | 15/150 | 66.33 | 1.34012 | 5.275 | na | na | na | 59.30 |
| TYPE 7 | 10/100 | 41.00 | 1.34465 | na | 33.00 | 1.33448 | na | na |
| TYPE 8 | 15/150 | 98.47 | 1.34100 | 5.359 | na | na | na | na |
| TYPE 9 | 15/150 | 95.00 | 1.34101 | 5.380 | na | na | na | na |
| TYPE 2 | 17/150 | 86.45 | 1.34144 | 5.376 | 35.88 | 1.33488 | 6.07 | 4.05 |
| TYPE 3 | 17/150 | 89.3 | 1.34194 | 5.349 | 36.5 | 1.33492 | 5.909 | 1.00 |
| TYPE 4 | 17/150 | 71.4 | 1.34506 | 5.391 | 18.6 | 1.33544 | 5.902 | 18.0 |

The invention claimed is:

1. Apparatus for preparing a coffee beverage by imbibing a dose of coffee with an extraction fluid taken through said dose by heating, comprising an inhibition device arranged to inhibit said imbibing when said fluid contains a substantial steam phase, wherein said inhibition device acts so as to avoid the formation of said substantial steam phase in a containing element that receives said fluid to be heated and so as to prevent said coffee beverage from being extracted by said fluid containing said substantial steam phase.

2. Apparatus according to claim 1, wherein said inhibition device comprises a temperature sensor to detect the temperature of said fluid inside said containing element.

3. Apparatus according to claim 2, wherein said temperature sensor comprises a temperature adjusting device arranged to maintain a desired temperature range inside said containing element.

4. Apparatus according to claim 3, wherein said temperature adjusting device enables a temperature comprised between approximately 60° C. and 120° C. to be maintained inside said containing element.

5. Apparatus according to claim 1, wherein said inhibition device comprises a level-sensor arranged to detect the level of said fluid inside said containing element.

6. Apparatus according to claim 1, wherein said inhibition device further comprises a pressure sensor arranged to detect the pressure of said fluid inside said containing element.

7. Apparatus according to claim 6, wherein said pressure sensor comprises a safety valve device arranged to maintain pressure values within a set range of values inside said containing element.

8. Apparatus according to claim 7, wherein said safety valve device enables the corresponding pressure values to be maintained between 0.01 bar and 5 bar inside said containing element.

9. Apparatus according to claim 1, wherein said inhibition device cooperates with a signalling device arranged to emit warning signals to a user of said apparatus.

10. Apparatus according to claim 9, wherein said signalling device comprises an acoustic signalling element.

11. Apparatus according to claim 9, wherein said signalling device comprises a visual signalling element.

12. Apparatus according to claim 1, wherein said inhibition device comprises switch elements arranged to switch on/switch off said apparatus.

13. Apparatus according to claim 1, wherein said inhibition device cooperates with a power regulating system arranged to suitably regulate the power absorbed by said apparatus.

14. Apparatus according to claim 1 and further comprising a heat transmitting device arranged to generate said heating.

15. Apparatus according to claim 1 and further comprising an electric resistance element arranged to generate said heating.

16. Apparatus according to claim 1, wherein said dose of coffee comprises coffee powder or minced coffee.

17. Apparatus according to claim 1, wherein said dose of coffee comprises capsules, and/or portions, and/or cartridges containing desired preset quantities of coffee.

18. Method for obtaining a coffee beverage comprising heating an extraction fluid to induce said fluid to pass through a dose of coffee and inhibiting said passing when said extraction fluid contains a substantial steam phase, wherein said inhibiting comprises avoiding the formation of said substantial steam phase in a containing element that receives said fluid to be heated, so as to prevent said coffee beverage from being extracted by said fluid containing said substantial steam phase.

19. Method according to claim 18, and further comprising pouring said extraction fluid to be heated into said containing element.

20. Method according to claim 19, wherein said inhibiting comprises detecting the temperature of said fluid inside said containing element.

21. Method according to claim 20, wherein said detecting the temperature comprises adjusting the temperature of said extraction fluid inside said containing element within a desired range of values.

22. Method according to claim 21, wherein said adjusting the temperature comprises maintaining the temperature of said fluid inside said containing element within values comprised between approximately 60° C. and 120° C.

23. Method according to claim 19, wherein said inhibiting comprises detecting the level of said fluid inside said containing element.

24. Method according to claim 19, wherein said inhibiting comprises detecting the pressure of said fluid inside said containing element.

25. Method according to claim 19, wherein said inhibiting comprises further maintaining the pressure inside said containing element within a desired range of values by safety a relief valve element.

26. Method according to claim 25, wherein said further maintaining comprises maintaining the relative pressure in said containing element by means of a safety valve element within a range of values comprised between approximately 0.01 bar and 5 bar.

27. Method according to claim 18, wherein said inhibiting further comprises transmitting warning signals to a user.

28. Method according to claim 27, wherein said transmitting signals comprises transmitting acoustic signals.

29. Method according to claim 27, wherein said transmitting signals comprises transmitting visible signals.

30. Method according to claim 18, wherein said inhibiting further comprises stopping said heating.

31. Method according to claim 18, wherein said inhibiting further comprises appropriately regulating the power absorbed during said heating.

32. Method according to claim 18, wherein said heating comprises absorbing heat from an electric resistance device arranged to generate said heating.

33. Method according to claim 18, and further comprising the use of coffee in powder or anyway minced form.

34. Method according to claim 18, and further comprising the use of capsules, portions or cartridges containing desired preset quantities of coffee powder.

* * * * *